C. J. LANTIS.
TRAP.
APPLICATION FILED NOV. 15, 1916.
1,231,390.
Patented June 26, 1917.
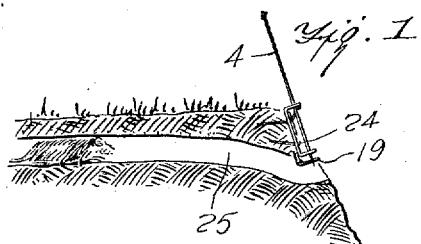
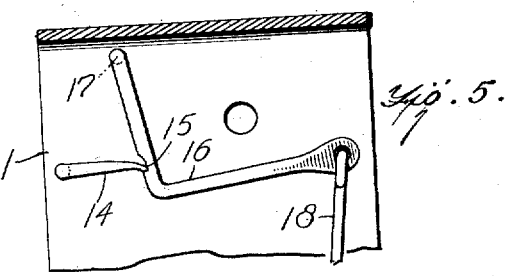
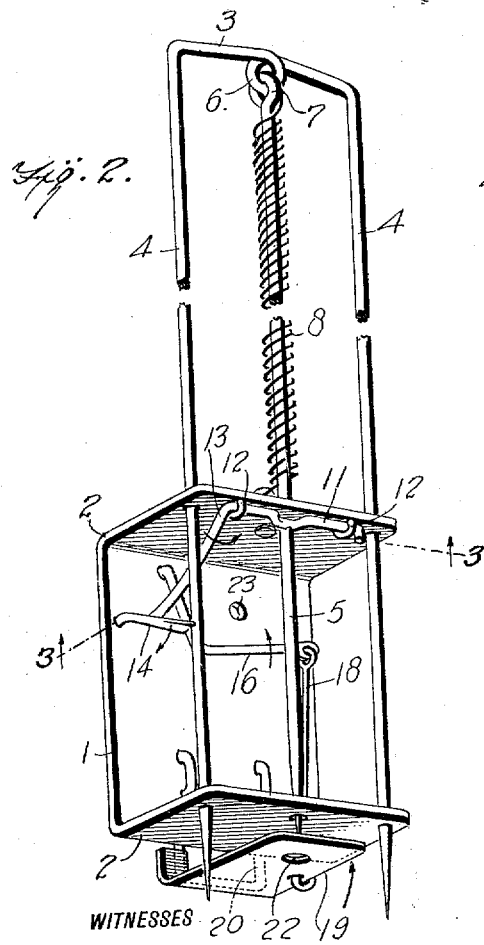
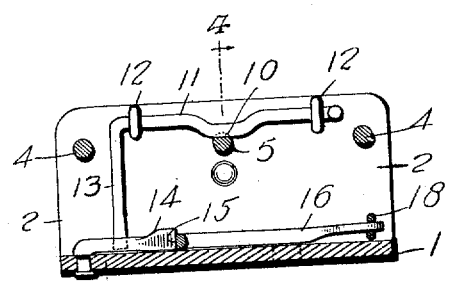
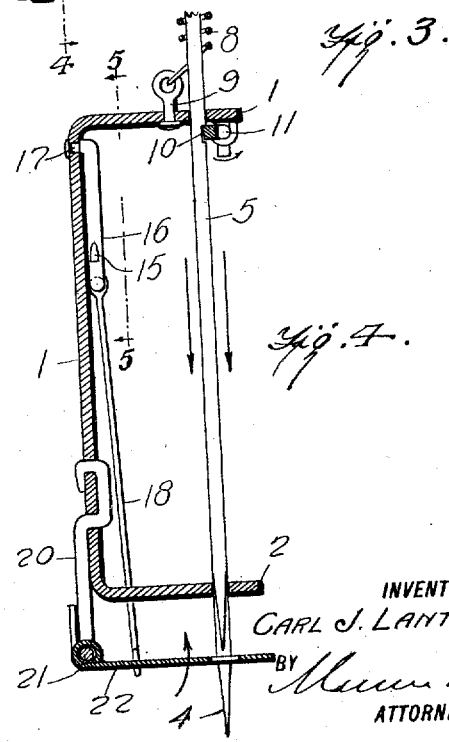
WITNESSES
L. H. Schmidt
W. E. Beck
INVENTOR
CARL J. LANTIS,
BY
ATTORNEYS

UNITED STATES PATENT OFFICE.

CARL JAMES LANTIS, OF CHAPMAN, KANSAS.

TRAP.

1,231,390.  Specification of Letters Patent.  Patented June 26, 1917.

Application filed November 15, 1916. Serial No. 131,488.

*To all whom it may concern:*

Be it known that I, CARL J. LANTIS, a citizen of the United States, and a resident of Chapman, in the county of Dickinson and State of Kansas, have invented certain new and useful Improvements in Traps, of which the following is a specification.

My invention is an improvement in traps, and has for its object to provide a trap especially designed for use in trapping gophers and like burrowing animals, wherein a supporting frame is provided together with a spring operated transfixing member movable with respect to the supporting frame, together with trigger mechanism for normally holding the transfixing member in inoperative position, and adapted to be released by the movement of the animal passing the trap.

In the present embodiment of the invention,

Figure 1 is a diagrammatic view showing the manner of setting the trap,

Fig. 2 is a perspective view of the trap,

Fig. 3 is a section on the line 3—3 of Fig. 2,

Fig. 4 is a section on the line 4—4 of Fig. 3, and

Fig. 5 is a section on the line 5—5 of Fig. 4, Figs. 3, 4 and 5 looking in the direction of the arrows adjacent to the respective lines.

The present embodiment of the invention comprises a supporting frame, a bracket of substantially U-shape and consisting of a body 1, and arms 2 extending laterally from the ends of the body. The transfixing member is a fork or substantially U-shaped member comprising a body 3 and arms or tines 4 extending laterally from the body and pointed at their free ends, and these arms or tines are mounted to slide in openings in the arms 2 of the supporting bracket. A third transfixing arm 5 is arranged between the arms 4, and is connected to the body 3 by means of a loop 6 formed in the body and engaged by an eye 7 on the transfixing arm. A coil spring 8 encircles the tine 5 and is connected at one end to the eye 7, and at the other to an eye 9 on the upper member or arm 2 of the supporting bracket, the said spring acting normally to move the transfixing member longitudinally of the body. The tine or arm 5 is mounted to slide in openings of the arm 2 of the supporting bracket, and the said arm or tine is of less length than the tines 4, as clearly shown in Figs. 2 and 4.

The tine 5 is provided with a notch 10 intermediate its ends, and this notch is adapted to be engaged by a latch member 11 journaled in bearings 12 on the upper arm 2 of the supporting frame.

The portion which engages the notch 10 is offset laterally with respect to a body of the latch, and the said latch is provided at one end with a radial arm 13. This arm is adapted to be engaged by a catch 14 pivoted to the body of the plate, and the catch has its free end flattened and widened for engaging a notch 15 in an angular trigger member 16, which is also pivoted at one end to the body 1 of the supporting frame, as indicated at 17. The other end of the angular trigger is connected by a link 18 with a trip plate 19 arranged below the lowermost arm 2 of the supporting frame and hinged to a supporting yoke 20 connected with the body of the frame. The body portion of the yoke extends below the arm 2, and the trip plate is hinged thereto as indicated at 21, in such manner that the said plate may swing toward the arm 2 or away therefrom. This trip plate is arranged between the tines 4 and it has an opening 22 through which the tine 5 may pass.

The body 1 of the supporting frame is provided with openings 23 through which may be driven stakes 24, to anchor the trap to the ground, in the manner shown in Fig. 1, at the mouth of the burrow 25 through which the gopher will pass.

The operation of the improved trap is as follows: In order to set the same, the fork is moved against the resistance of the spring 8, until the offset portion of the latch 11 will engage the notch 10 of the tine 5. The arm 13 of the said latch member is then engaged by the catch 14, and the free end of the catch is engaged with the notch 15 of the trigger 16. When so engaged, the trip plate 19 will be held substantially parallel with the adjacent arm 2 of the supporting frame, and it will be evident that the least upward movement of the said trip plate will swing the trigger 16 away from the free end of the catch 14, thus releasing the said catch and the arm 13 of the latch member. The latch member will swing under the influence of the spring 8, and the tines of the transfixing member will be driven violently toward the trip plate 19. When the trap is set in the manner shown in Fig. 1, a very slight engagement between the body of the gopher and the trip plate 19 will release the transfixing member and cause it to pierce the body of the gopher.

The objection to the ordinary gopher trap is, that they will be pushed full of dirt by the gopher, springing the trap before the animal gets near enough to be caught. With the present trap the tines of the transfixing member will pierce this dirt and will transfix the gopher.

I claim:

A trap comprising a substantially U-shaped supporting bracket, a transfixing member having guided movement longitudinally of the said bracket, said member having a central and lateral tines slidable in the bracket, a spring acting normally to force the transfixing member longitudinally of the bracket, trigger mechanism for holding the transfixing member with the spring under tension, said mechanism comprising an elbow lever having one of its arms pivoted to the bracket, a trip plate connected with the other and arranged below the bracket, said first named arm of the elbow lever having a notch, a catch pivoted to the bracket and engaging the notch, a rod journaled on the bracket and having an offset portion, the central tine having a notch for engagement by the said offset portion, and said rod having a lateral arm for engaging the catch.

CARL JAMES LANTIS.

Witnesses:
WALTER N. WILKINS,
RALPH W. LEMON.

Copies of this patent may be obtained for five cents each, by addressing the "Commissioner of Patents, Washington, D. C."